United States Patent [19]

Bukowski

[11] Patent Number: 5,059,797

[45] Date of Patent: Oct. 22, 1991

[54] APPARATUS FOR MEASURING THE DOSE RATE IN A TRANSPORTATION FLASK CONTAINING RADIOACTIVE WASTE

[75] Inventor: Claude Bukowski, Bretteville en Saire, France

[73] Assignee: Cogema - Compagnie Generale des Matieres Nucleaires, France

[21] Appl. No.: 609,421

[22] Filed: Nov. 5, 1990

[30] Foreign Application Priority Data

Nov. 9, 1989 [FR] France ............................... 89 14702

[51] Int. Cl.[5] ............................................. G01T 1/167

[52] U.S. Cl. ............................... 250/336.1; 250/506.1

[58] Field of Search .......................... 250/336.1, 506.1; 252/632, 633

[56] References Cited

U.S. PATENT DOCUMENTS

| | | | |
|---|---|---|---|
| 3,643,096 | 2/1972 | Jeffries, Jr. et al. | 250/506.1 X |
| 4,620,800 | 11/1986 | Anno | 250/336.1 X |
| 4,822,238 | 4/1989 | Kwech | 414/730 |

FOREIGN PATENT DOCUMENTS

| | | | |
|---|---|---|---|
| 60-131498 | 7/1985 | Japan | 250/506.1 |
| 62-217181 | 9/1987 | Japan | 250/336.1 |
| 63-42737 | 8/1988 | Japan | 250/506.1 |
| 1206767 | 9/1970 | United Kingdom . | |

*Primary Examiner*—Constantine Hannaher
*Assistant Examiner*—Jacob M. Eisenberg

[57] ABSTRACT

Prior to the transportation to a discharge site of a casket or flask in which has been placed a container filled with radioactive waste, through a hole formed in the flask is introduced a probe holder (32) connected by electrical connectors (76,80) to an external measuring apparatus. The probe holder (31) is provided with a handle (68) making it possible, through a mechanism (66,56,54,50), to swing a door (42) to which a probe (34) is fixed between a retracted introduction position and a measuring position in which the probe can be oriented at 90° relative to the probe holder axis. After the probe holder has been coupled by a nut (40) to a container carrier in which is located the container containing the waste, a precise, reproducible measurement of the dose rate within the transportation flask can be carried out.

8 Claims, 4 Drawing Sheets

Figure 1:
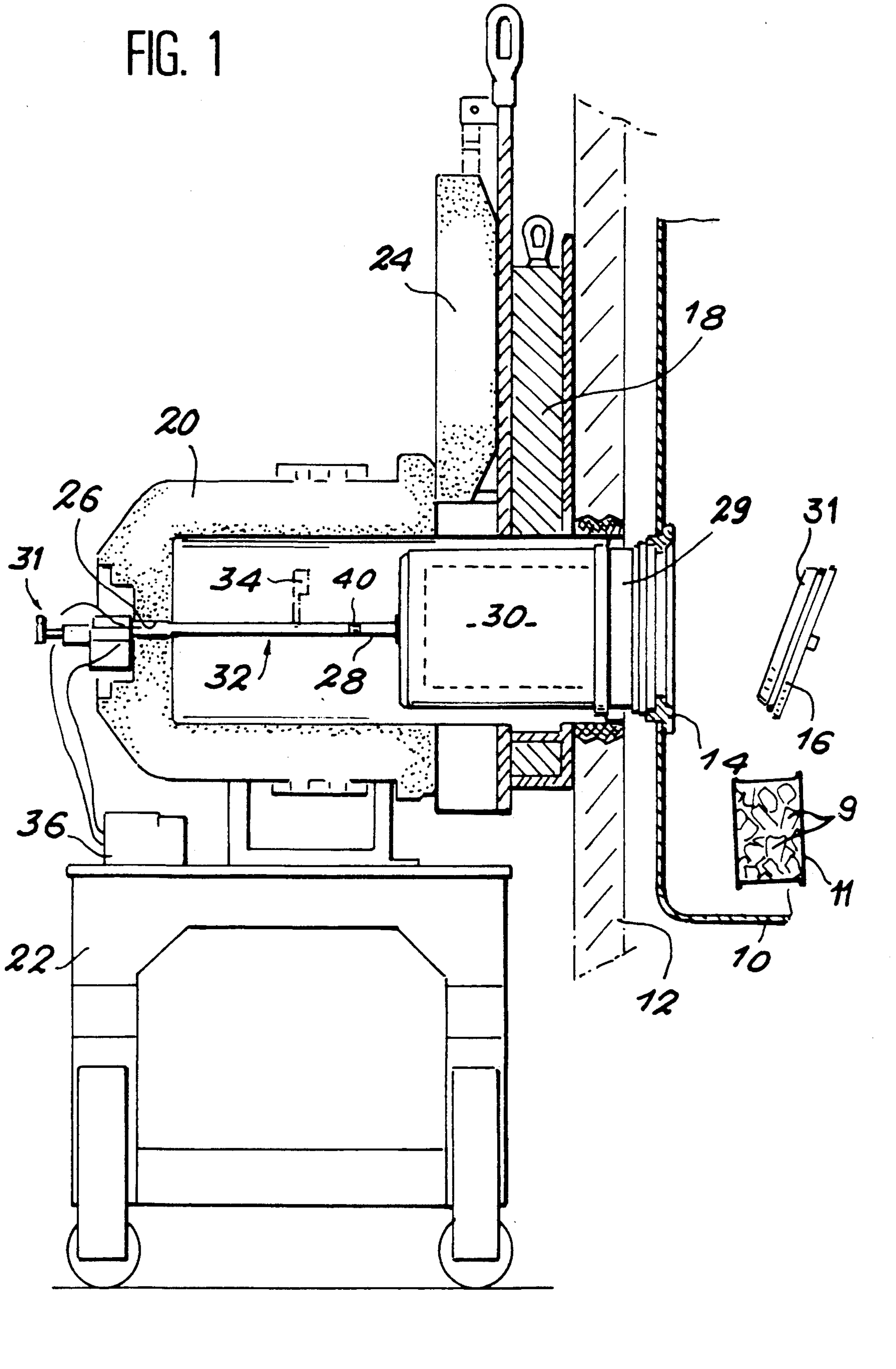

APPARATUS FOR MEASURING THE DOSE RATE IN A TRANSPORTATION FLASK CONTAINING RADIOACTIVE WASTE

The invention relates to an apparatus making it possible to measure the dose rate in a transportation flask or casket, in which is placed a container filled with radioactive waste.

Certain waste emitting $\alpha$, $\beta$ and $\gamma$ radiation. Such as those resulting from the reprocessing of nuclear fuels used in nuclear power stations, are generally stored on sites separate from those where said waste is produced. In order to carry out transportation, followed by storage of said waste, the waste is placed in containers, after which each container is introduced into a transportation flask connected to a confinement enclosure containing the waste and without breaking the confinement of said enclosure. More specifically, each container is placed in a container carrier located within the transportation flask.

Certain existing transportation flasks and in particular the Padirac flasks have a bottom through which there is a passage hole. After the engagement of the flask on the confinement enclosure, a transfer poker is introduced through said passage hole, after it has been coupled by its end to a screw projecting from the center of the face of the container carrier turned towards the bottom of the flask. The container in the container carrier can be engaged on the inner wall of the enclosure by said poker. After opening a double door, a generally cardboard bin containing the waste is transferred into the container. The double door is then closed again and the container holder, the container and the bin containing the waste are brought into the flask with the aid of the transfer poker.

In order that the containers containing the radioactive waste can be stored under satisfactory safety conditions, it is desirable to know the activity of the waste contained in the flasks. At present no means exists for carrying out this measurement.

The invention specifically relates to an apparatus making it possible to directly measure the dose rate within a transportation flask having the characteristics indicated hereinbefore, so as to be able to improve the knowledge of the content of the transported flasks and consequently the safety of storage, as well as the control of activities.

According to the invention this result is achieved by means of an apparatus for measuring the dose rate within a transportation flask containing a container carrier able to receive a container filled with radioactive waste, the transportation flask having a bottom which has a passage opening for a transfer poker, which can be coupled to a screw of the container carrier, said apparatus comprising a probe holder having a tube able to pass through the passage hole, a coupling nut mounted at one end of the tube and which can be coupled to the screw of the container carrier, an articulated door formed in the tube and able to occupy a closed position and an open position, and manipulating means accessible from the opposite end of the tube and controlling a displacement of the door between its open and closed positions; a probe for measuring the dose rate fixed to the door in such a way that it can be retracted into the tube when the door is in the closed position; an external measuring means connected to the probe for measuring the dose rate by electrical conductors passing into the tube.

As a result of such an apparatus, it is possible to directly measure the dose rate within the transportation flask, when the container filled with radioactive waste is introduced into said flask, without it being necessary to in any way modify the structure of the latter. Moreover, the distance separating the measuring probe from the container is accurately known no matter what flask type is used, which makes it possible to ensure that the measurements are strictly reproducible. It is also possible to rotate the probe holder and consequently the probe by 360°, which makes it possible to detect any hot point in the container.

In order to further improve the reproducibility of the measurement, the manipulating or operating means also preferably control the closing of an electric supply circuit for a display system of the measuring means, when the door is in the open position, i.e. For example when the probe is oriented at approximately 90° with respect to the tube axis.

In a preferred embodiment of the invention, the manipulating means comprise a rod sliding axially within the tube and whereof one end is articulated to a link articulated to the door and positioned opposite to the latter with respect to its articulation axis on the tube. The opposite end of the rod is then linked in translation with a control handle cooperating by a screw - nut system with the end of the tube opposite to the coupling nut.

The end of the rod opposite to the link is then preferably integral with a bush or socket, which automatically closes a switch mounted at the end of the tube opposite to the coupling nut and belonging to the electric supply circuit of the display system, when the socket arrives a front position corresponding to the open position of the door.

Moreover, as the coupling nut is mounted in rotary manner on the probe holder, means are provided for controlling the locking in rotation of the nut with respect to the probe holder.

A preferred embodiment of the invention is described in non-limitative manner hereinafter relative to the drawings, wherein show:

FIG. 1 a sectional view diagrammatically illustrating the measurement of the dose rate within a transportation casket or flask, using a measuring apparatus according to the invention, following the transfer into the container of a bin filled with radioactive waste.

Figure 2:
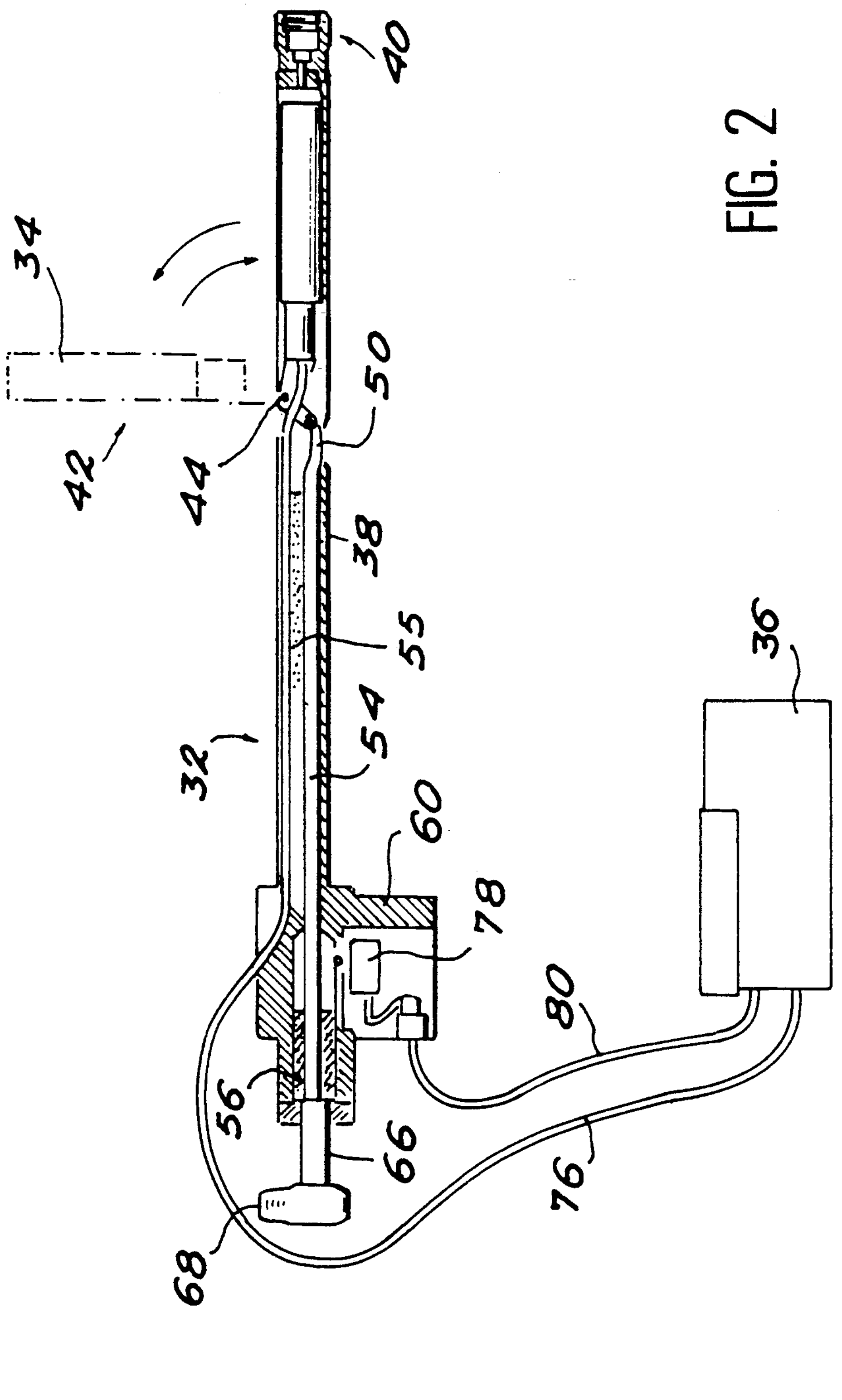

FIG. 2 a longitudinal sectional view showing the dose rate measuring apparatus according to the invention.

Figure 3:
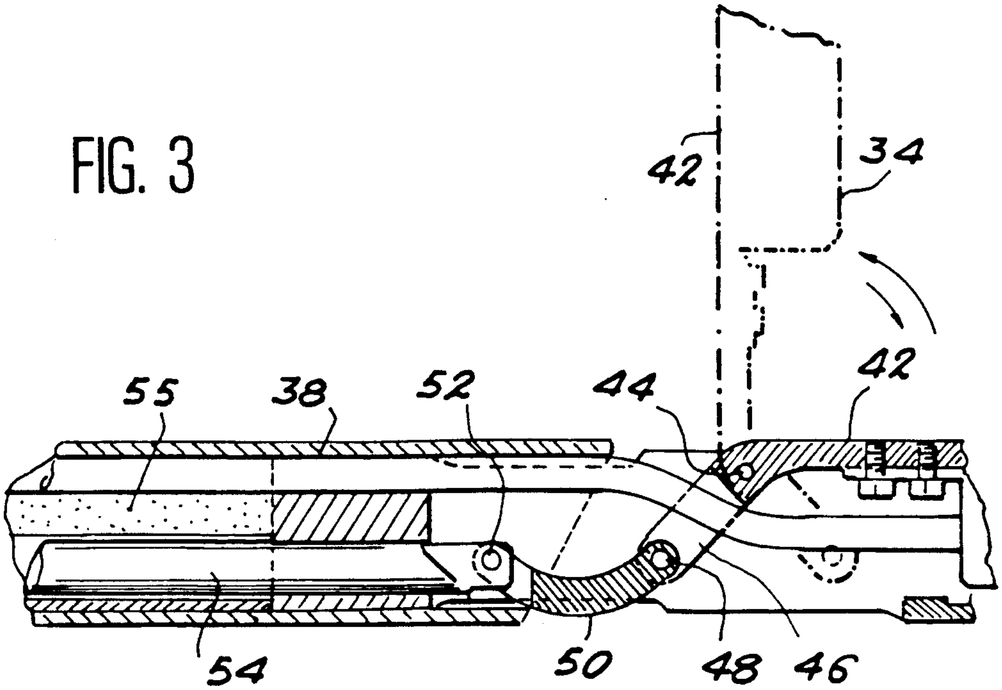

FIG. 3 a larger scale sectional view illustrating the pivoting control of the door on which the probe is mounted.

Figure 4:
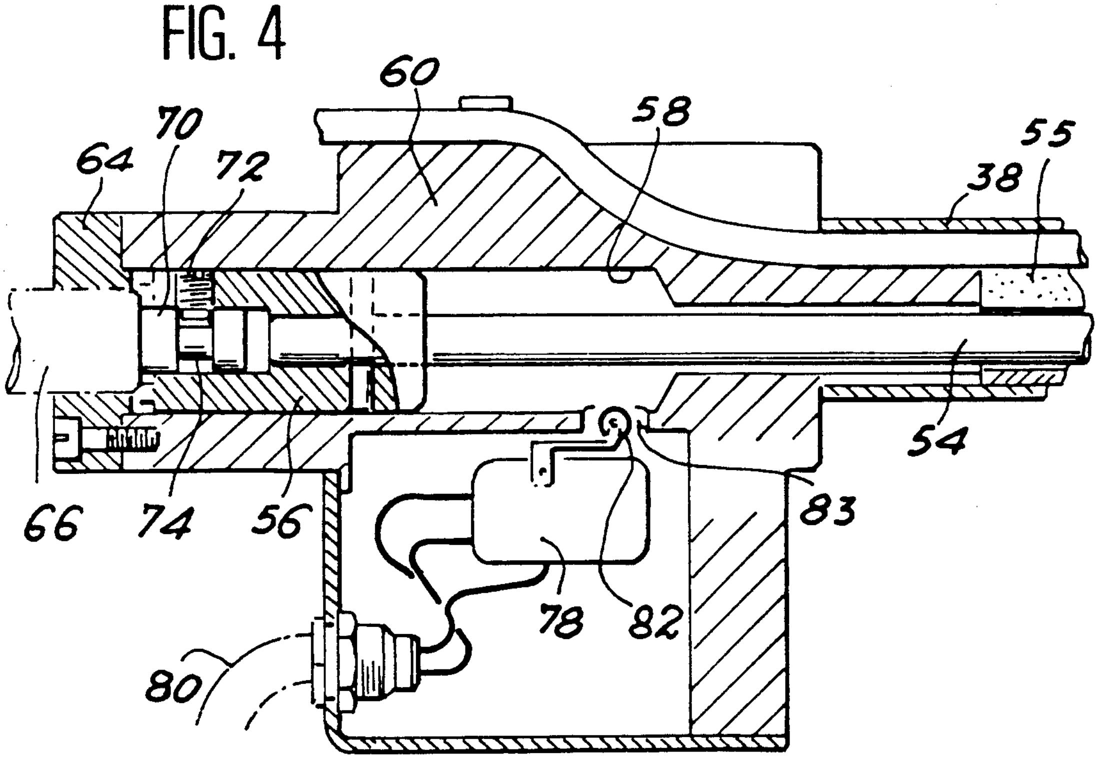

FIG. 4 a longitudinal sectional view showing on a larger scale the end of the probe holder located outside the transportation flask.

Figure 5:
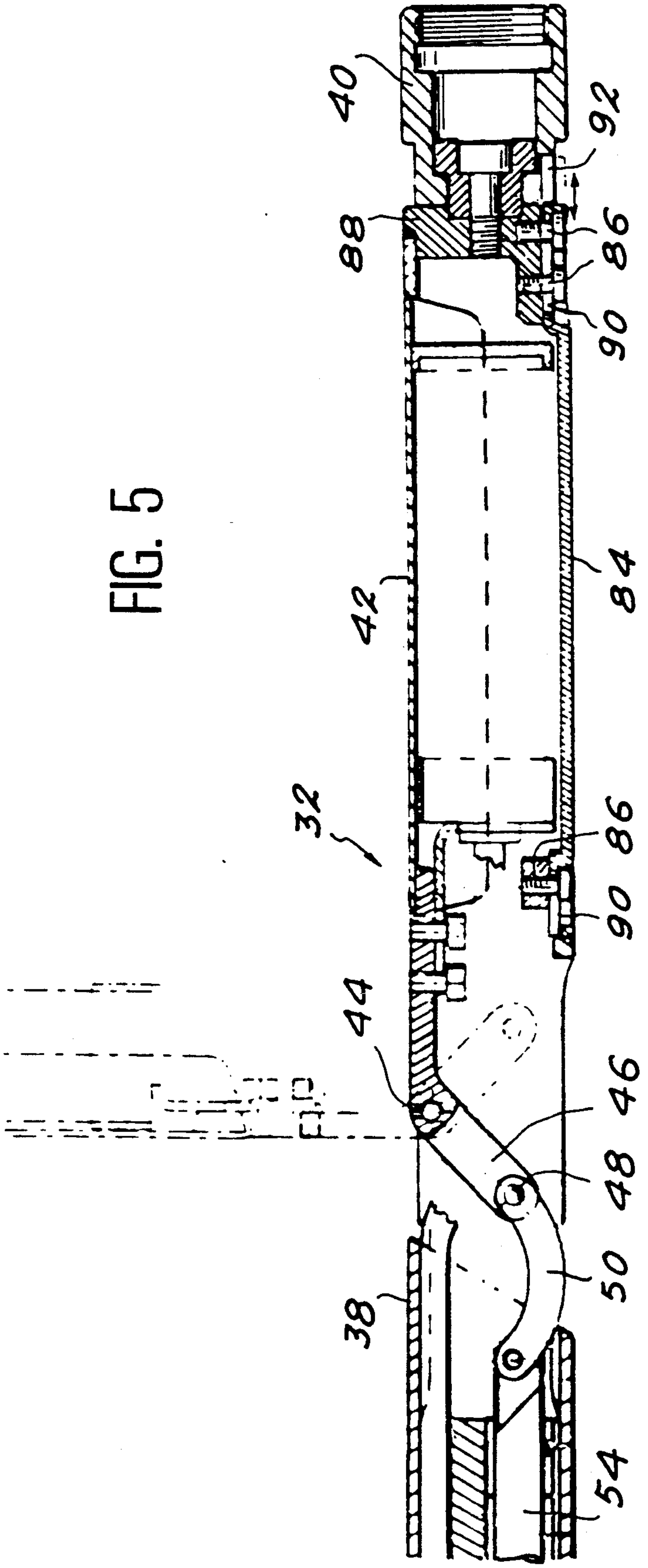

FIG. 5 a larger scale, longitudinal sectional view of the end of the probe holder, which can be fixed to the container carrier, in accordance with a variant of the invention.

In FIG. 1, the reference 10 designates the wall of a confinement enclosure, whereof only part is shown. Said wall 10 is externally duplicated by a biological protection 12. The confinement enclosure, which contains the radioactive waste, can in particular be located at a reprocessing site for fuel from nuclear reactors.

In order to permit the discharge of radioactive waste contained therein the confinement enclosure wall 10 has at least one access opening defined by a flange 14 and normally sealed by a door 16. The biological protection 12 also has an opening facing the door 16 and normally sealed by a sliding door called a weighted door 18.

FIG. 1 also shows a transportation flask 20 of the Padirac type mounted on a support table 22 and engaged on the opening formed in the biological protection 12 of the enclosure. For this purpose, the transportation flask 20 is placed on the trolley 22 in such a way that its axis is approximately horizontal and its end, normally sealed by a sliding door 24, is tightly fixed to the enclosure biological protection 12 and positioned facing the opening formed in said biological protection. When the transportation flask 20 has been engaged on the biological protection 12. The doors 18 and 24 are open. A transfer poker is then coupled to a screw 28 projecting from the center of the bottom of a container carrier 30 located in the flask 20, using a passage hole 26 formed in the center of the bottom of the latter. By means of the said poker, transfer takes place of the container carrier 30 and the container 29 which it carries, into the position illustrated in FIG. 1, where the container 29 is tightly engaged on the opening formed in the wall 10. The double door formed by the door 16 and by the door 31 of the container is then open and the waste 9 contained in an e.g. cardboard bin 11 are transferred into the container 29. The latter, which then contains the radioactive waste filling the bin 11 is then transferred into the transportation flask 20 by means of the handling poker, which operates the container carrier 30. The double door 16, 31 is then closed again.

Up to now, when said transfer operation is finished, the passage door 26 was sealed, the doors 18 and 24 closed and the flask was disengaged from the biological protection 12. The dose rate outside the flask was then checked prior to the flask being transferred to the chosen storage site.

According to the invention and in order to improve the control and safety conditions during the storage of the containers 29, the flow rate within the transportation flask 20 is measured, just before the container carrier 30 containing the radioactive waste-filled container 29 was brought into the flask 20. For this purpose, use is made of a measuring apparatus designated by the general reference numeral 31 in FIG. 1 and which mainly comprises, in the manner illustrated in greater detail in FIG. 2, a probe holder 32, a dose rate measuring probe 34 and an external measuring device 36.

The probe holder 32 comprises a rectilinear tube 38, whose external diameter, identical to that of the transfer poker, enables it to pass through the passage hole 26 formed in the bottom of the flask 20. At its front end for introduction into the transportation flask 20, the tube 38 has a rotary coupling nut 40, which can be coupled by screwing to the screw 28 projecting from the bottom of the container carrier 30.

In its part adjacent to the coupling nu 40, the tube 38 has an opening, which can be sealed by an articulated door 42 having a semicircular section. Said door 42 is articulated to the tube 38, at its end opposite to the coupling nut 40, by a spindle 44 orthogonal to the axis of the tube 38 and displaced from the side of the door 42 with respect to the latter.

As is better illustrated by FIG. 3, the articulated door 42 is extended beyond the spindle 44 by a part 46 oriented obliquely rearwards within the tube 38. At its end, said part 46 is articulated by a spindle parallel to the spindle 44 and located on the other side of the axis of the tube 38 with respect to said spindle 34, at the end of a circular arc-shaped link 50, whose concavity is turned towards the spindle 44. The opposite end of the link 50 is articulated by a spindle 52 parallel to the spindle 48 and located on the same side and approximately at the same distance as the latter from the axis of the tube 38, at the front end of a cylindrical rod 54. The latter is mounted in sliding manner within the tube 38 along an axis parallel to the axis of the latter and intersecting the spindle 52 in lead members 55 filling the corresponding part of the tube 38 and used for biological protection purposes.

As is better illustrated in FIG. 7, the opposite end of the rod 54 is e.g. fixed by means of a key 57 in a bush or socket 56, received in sliding manner in a bore 58 formed in a member 60 to which is fixed the rear end of the tube 38. The bush 56 is immobilized in rotation in the part 60, e.g. by a key fixed to the latter and projecting into an axial recess formed on the bush 56.

At its rear end opposite to the tube 38, the part 60 has a nut 64 into which is screwed a threaded rod 66 integral with an operating handle 68. Opposite to the handle 68, the threaded rod 66 is extended by a cylindrical portion 70 received in a bore formed axially in the bush 56. A grub screw 72 radially traversing the latter penetrates by its end a groove 74 formed in the cylindrical portion 70, so that the operating handle 36 is joined in translation with the bush 56 and consequently the rod 54.

The arrangement described hereinbefore makes it possible by moving the handle 68 in one or other direction to move the door 52 between a closed position in which said door constitutes a complimentary part of the tube 38 and an open position in which the door 42 can e.g. be oriented by approximately 90° with respect to the axis of the tube 38.

As is illustrated in FIG. 2, the probe for measuring the dose rate 34 is fixed to the inner face of the door 42 by a random appropriate fixing means, such as screws. This measuring probe can be constituted by a random probe, whose overall dimensions are sufficiently small to enable it to be completely retracted within the tube 38 when the door 42 is in the closed position. As a non-limitative example, it can e.g. be a SHF IF104 SAPHYMO silicon probe allowing the measurement of a dose rate between 0.1 and $3.10^4$rad/h.

This probe is connected to the external measuring device 36 by electrical connectors 76 located within the tube 38 in a passage formed for this purpose in the lead members 55 and then pass between the probe holder 32 and the measuring device 36. The latter is chosen so as to be compatible with the probe 34. It can therefore constituted by any existing or future measuring device compatible with a probe, whose dimensions enable it to be entirely retracted within the tube 38. When a silicon probe is used, it can be a IF104 SAPHYMO system.

Advantageously, the part 60 also supports a switch such as a microcontact 78, which is placed in a direct current power supply circuit for the display system of the external measuring device 36. FIG. 2 shows the conductors 80 of the circuit connecting the microcontact 78 to the measuring device 36. As is best illustrated by FIG. 4, the microcontact 78 incorporates an operating member 82 projecting through a hole 83 in the front part of the bore 58. When the front face of the bush 56 forces the operating member 82 of the microcontact 78 in the opening direction of the door 42 during the manipulation of the handle 68, the direct current supply circuit of the display system of the measuring device 36 is automatically rendered live. By accurately positioning the microcontact 78 in the part 60, it is thus possible to be sure that the display of the measurements is obtained for a clearly defined and perfectly reproducible open position of the door 42. This position e.g. corresponds to a 90° orientation of the door 42 relative to the axis of the tube 38. It can vary as a function of the length of the bush 56.

When it is wished to use the thus obtained dose rate measuring apparatus, the front end of the probe holder 32 is coupled to the container carrier by screwing the coupling nut 40 to the screw 28 of the container carrier 30, when the latter is placed in the flask 20 and contains the container 29 filled with radioactive waste. At this time, the door 42 is in the closed position and the probe 34 is retracted into the tube 38. When the tube 38 has been coupled to the container carrier 30, the probe holder 32 is inserted in the transportation flask 20 by a distance depending on the type of flask used, said distance being checked by a mark on the outside of the tube 38.

The operator then operates the handle 68, so as to bring the door 42 carrying the probe 34 into the open position. On reaching this position, the microcontact 78 automatically closes the direct current supply circuit of the display system of the device 36 and the display of the dose rate starts. During the measurement, the probe holder is rotated by 360° around the axis of the tube 38, which makes it possible to perform a circular sweep within the flask. The presence of any hot points in the container can be detected in this way. When the measurement is completed, the door 42 is brought into the closed position by again operating the handle 36 and the probe holder 32 is brought towards the outside of the passage hole 26, which has the effect of bringing the container carrier 30 containing the radioactive waste-filled container 29 into the flask 20. The coupling nut 40 is then unscrewed and the probe holder 32 is removed from the flask . The passage hole 26 and the various doors 18 and 24 can then be closed and the flask separated from the confinement enclosure and then transported to its discharge site.

In order that the measurements performed within the transportation flask 20 do not suffer from errors due to background noise from the confinement enclosure 10, the hereinbefore described operation can be preceded by an operation of measuring said background noise, which is also carried out by means of measuring apparatus 31, before the container 29 is filled with radioactive waste.

The use of the measuring apparatus 31 according to the invention makes it possible to carry out dose rate measurements within the transportation flask 20 without any modification to the structure of the latter and in a perfectly reproducible way, because the positioning of the probe within the flask can be accurately controlled and the distance separating the probe from the container is perfectly constant.

In the embodiment described hereinbefore with reference to FIGS. 1 to 4, there is no possibility of rendering integral in rotation the nut 40 and the rod 38. This can be disadvantageous in certain cases, because the container carrier 30 must be indexed in rotation on a not shown stud placed within the transportation flask 20, when it is brought into the latter at the end of the measurement. Thus, the container carrier 30 can rotate within the flask 20, e.g. under the effect of a non-homogeneous load placed in the container 29 during the manipulation necessary for the measurement and when the container carrier is no longer immobilized in rotation by the indexing stud.

In order to obviate this disadvantage, in the variant which will now be described with reference to FIG. 5, means are provided making it possible to render integral in rotation the nut 40 and the tube 38. It is possible to manipulate these means from the outside when the probe holder 32 is partly removed from the flask at the end of the measurement.

In the represented example, these means comprise a pull knob 84 supported by the tube 38 at a location diametrically opposite to the door 42, so as to be able to slide parallel to the axis of the tube 38 between a front position for the locking of the nut 40 and a rear position for unlocking the said nut. The pull knob 84 is supported and guided at each of its ends by screws 86 fixed to internal parts 88 integral with the tube 38. These screws 86 traverse longitudinally slots 90 formed in end portions of the pull knob 84. They have widened heads, which are wider than the slots 90, which do not project beyond the outer envelope of the tube 38 and maintain the pull knob 84 in place. When the pull knob 84 is in its rear position unlocking the nut 40. Its front end is just flush with the front end of the tube 38. However, when the pull knob 84 is in its front position locking the nut 40, its front end penetrates a longitudinal recess 92 formed on the latter. This prevents any rotation of the nut 40 relative to the tube 38.

This variant illustrated in FIG. 5 makes it possible to rotate the nut 40 independently of the remainder of the probe holder, in order to fix the latter to the screw 28 and rotate the probe holder 32 relative to the container carrier 30 in order to carry out the measurement, in the same way as in the previously described embodiment. For this purpose, the pull knob 84 is then placed in its rear nut unlocking position.

The locking in rotation of the nut 40 with respect to the probe holder 32 obtained when the pull knob 84 occupies its front nut locking position, makes it possible to ensure the indexing in rotation of the container carrier 30 within the flask 20 during the withdrawal of the container carrier after performing the measurement.

Obviously the invention is not limited to the embodiment described in exemplified manner hereinbefore and in fact covers all variants thereof. Thus, the mechanism making it possible to control the displacement of the door supporting the probe between its open and closed position can differ from that described hereinbefore. Moreover, the microcontact automatically rendering live the power supply for the display of the measurement can in certain cases be eliminated and, when it is present, the initiation can be brought about in any position between 0° and 90° as a function of the length of the bush 56.

I claim:

1. Apparatus for measuring the dose rate within a transportation flask containing a container carrier able to receive a container filled with radioactive waste, the transportation flask having a bottom which has a passage opening for a transfer poker, which can be coupled to a screw of the container carrier, said apparatus comprising a probe holder having a tube able to pass through the passage hole, a coupling nut mounted at one end of the tube and which can be coupled to the screw of the container carrier, an articulated door formed in the tube and able to occupy a closed position and an open position, and manipulating means accessible from the opposite end of the tube and controlling a displacement of the door between its open and closed positions; a probe for measuring the dose rate fixed to the door in such a way that it can be retracted into the tube when the door is in the closed position; an external measuring means connected to the probe for measuring the dose rate by electrical conductors passing into the tube.

2. Apparatus according to claim 1, wherein the manipulating means also control the closing of an electric supply circuit for a display system of the measuring means, when the door is in the open position.

3. Apparatus according to claim 1, wherein the manipulating means comprise a rod sliding axially within the tube and whereof one end is articulated to a link articulated to the said door and positioned opposite to the latter with respect to its articulation axis on the tube.

4. Apparatus according to claim 3, wherein the manipulating means also comprise a control handle cooperating by a screw - nut system with the end of the tube opposite to the coupling nut and connected in translation to the end of the rod opposite to the link.

5. Apparatus according to claim 4, wherein the end of the rod opposite to the link is integral with a bush, which automatically closes a switch mounted at the end of the tube opposite to the coupling nut and belonging to the electric supply circuit of the display system, when the bush arrives in a front position corresponding to the open position of the door.

6. Apparatus according to claim 1, wherein the open position of the door corresponds to an orientation of the probe by approximately 90° relative to the tube axis.

7. Apparatus according to claim 1, wherein the coupling nut is mounted in rotary manner on the probe holder, means being provided for controlling a locking in rotation of the nut with respect to the probe holder.

8. Apparatus according to claim 7, wherein the said means for controlling a locking in rotation of the nut comprise a pull knob mounted in sliding manner on the tube parallel to the axis of the latter and a recess of the nut able to receive one end of the pull knob.

* * * * *